United States Patent [19]
Shibazaki et al.

[11] Patent Number: 5,462,710
[45] Date of Patent: Oct. 31, 1995

[54] MANUFACTURING METHOD OF A FLANGE FOR USE IN A FILM CARTRIDGE

[75] Inventors: Osamu Shibazaki; Hitoshi Ohkubo, both of Hino, Japan

[73] Assignee: Konica Corporation, Tokyo, Japan

[21] Appl. No.: 148,848

[22] Filed: Nov. 8, 1993

[30] Foreign Application Priority Data

Nov. 10, 1992 [JP] Japan .................. 4-324857

[51] Int. Cl.⁶ .................................. B29C 45/40
[52] U.S. Cl. .................. 264/297.2; 264/328.8; 264/328.9; 425/588
[58] Field of Search .............. 264/297.2, 328.8, 264/328.9, 161; 425/588

[56] References Cited

U.S. PATENT DOCUMENTS

| | | | |
|---|---|---|---|
| 3,523,991 | 8/1970 | Tucker | 264/328.8 |
| 4,423,943 | 1/1984 | Gold | 354/275 |
| 4,427,618 | 1/1984 | Sorensen | 264/328.8 |
| 4,734,027 | 3/1988 | Adams | 264/328.8 |
| 4,864,332 | 9/1989 | Harvey . | |
| 4,965,627 | 10/1990 | Robison . | |
| 5,013,513 | 5/1991 | Schad et al. | 264/328.8 |
| 5,031,852 | 7/1991 | Dowling et al. . | |
| 5,084,223 | 1/1992 | Morita et al. | 264/161 |
| 5,145,630 | 9/1992 | Schad | 264/328.8 |
| 5,221,538 | 6/1993 | Gasami et al. | 264/328.8 |

FOREIGN PATENT DOCUMENTS

| | | | |
|---|---|---|---|
| 0247822 | 12/1987 | European Pat. Off. | 264/328.9 |
| 53-143654 | 12/1978 | Japan | 264/161 |
| 57-22028 | 2/1982 | Japan | 425/588 |
| 58-168539 | 10/1983 | Japan | 264/328.9 |
| 59-98826 | 6/1984 | Japan | 425/588 |
| 3-214153 | 3/1991 | Japan . | |
| 2-251841 | 9/1992 | Japan . | |
| 2072569 | 10/1981 | United Kingdom | 264/328.8 |

*Primary Examiner*—Jeffery R. Thurlow
*Attorney, Agent, or Firm*—Frishauf, Holtz, Goodman, Langer & Chick

[57] ABSTRACT

A manufacturing method forms flanges for use in a film cartridge which are made of resin. Each flange is made of the resin by an injection molding process. Gates to cavities provided in a mold are located such that residual portions of solidified resin at the gates, remaining after the injection molding process has been completed, do not come into contact with a film in the cartridge as the film is moved into and out of the cartridge.

9 Claims, 7 Drawing Sheets

MANUFACTURING METHOD OF A FLANGE FOR USE IN A FILM CARTRIDGE

FIELD OF THE INVENTION

The present invention relates to a method for manufacturing cartridge in which a photographic roll film is light-tightly accommodated. Specifically, the present invention relates to a manufacturing method for a flange of the cartridge which has been disclosed in Japanese Patent Publication Open to Public Inspection No. 214,153/1991, and U.S. Pat. No. 5,031,852.

BACKGROUND OF THE INVENTION

A 35 mm roll film, which is in wide use, is accommodated in a light-tight container, which is called a patrone. In this case, a long film is used, and holes, which are called perforations, are successively provided on both sides of the film. A base end of the film is fixed to a spool shaft provided in the patrone and the film is wound around the shaft. A leader portion of the film is thrust outside of the patrone through a slit in which fiber material, which is called velvet, is arranged.

The patrone in which a 35 mm roll film is accommodated is on the market in Japan, and is made of metal. However, it has the following problems: a problem of manufacturing cost, a problem of film loading into a camera, a problem of making it smaller, a problem of recycling, and the like. Therefore, various kinds of plastic patrones or cartridges, which are standardized as a cartridge in this specification, have been proposed in, for example, Japanese Patent Publication Open to Public Inspection No. 214,153/1991, and U.S. Pat. No. 5,031,852.

Figure 6:
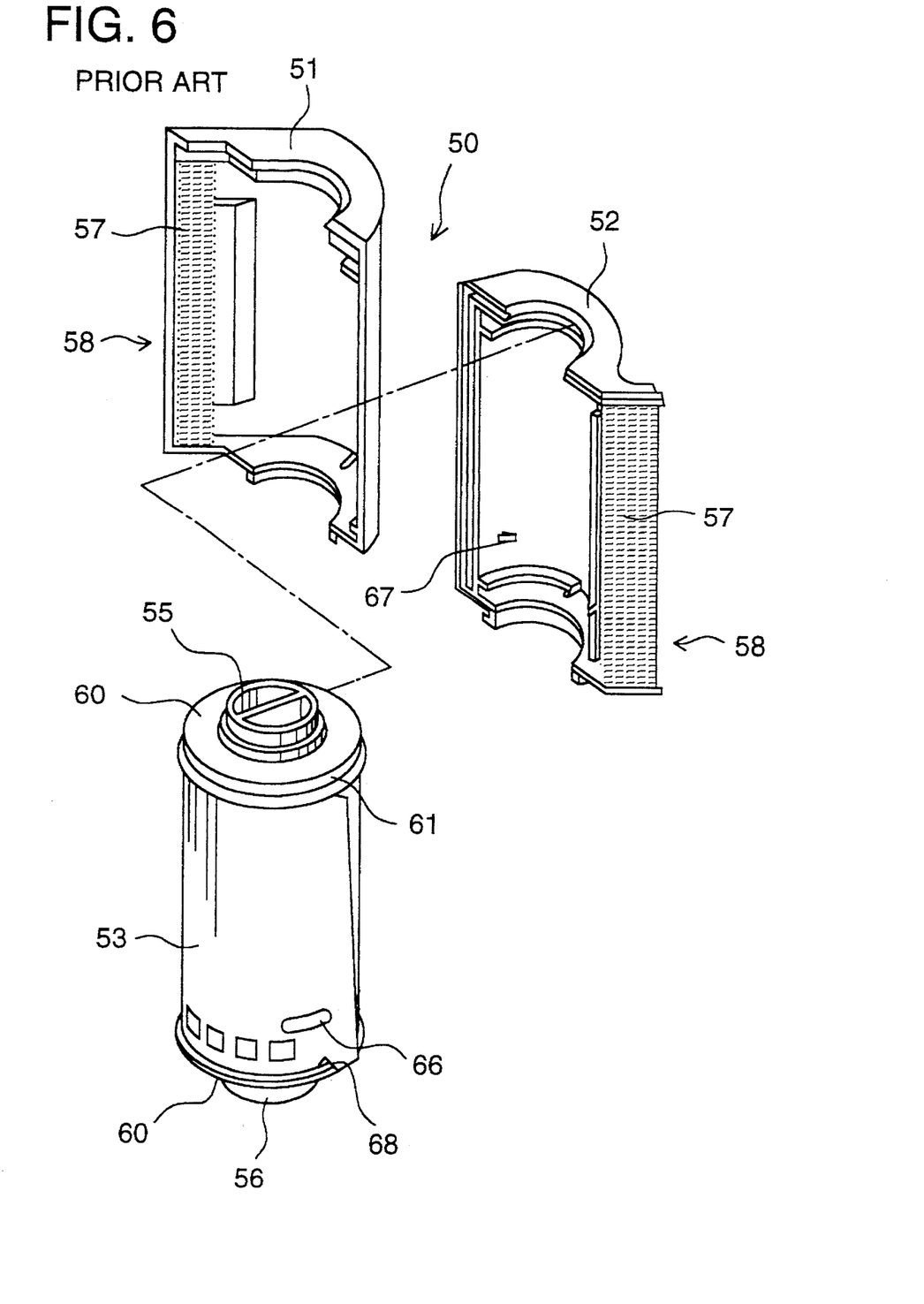
FIG. 6 is an exploded perspective view of a cartridge.

The cartridge disclosed in those publications is identical to that shown in FIG. 6, and the following points are greatly different from the cartridge for a 35 mm photographic roll film which is currently used. Firstly, the cartridge is not made of a metal, but made of synthetic resin; the leading edge of the film is pulled into the casing, and a leader portion is not exposed outside the casing, or a small portion of the leading edge portion of the film is exposed; and an accommodated film can be easily pulled into the casing or pulled out of the casing when a spool shaft of the cartridge is rotated. That is, the film cartridge is a so-called "non-leader portion type", and a new technology corresponding to various technical problems, which is not provided in the conventional metallic cartridge, is adopted in the film cartridge as follows: the leading edge of a film 53 is wound inside a cartridge main body 50, or fed outside the cartridge main body 50.

It is performed by the same mechanism as that of a conventional metallic patrone in that the film 53 is wound into the cartridge main body 50, because the base end of the film 53 is fixed to the spool shaft 54 (see FIG. 7) and the spool shaft 54 can only be rotated in the direction in which the film is wound into the cartridge main body. However, when the leading edge of the film 53 is wound into the cartridge main body 50, the structure, in which the film 53 is again fed out of the cartridge main body 50, should be considered, and the following special structure is adopted into the cartridge main body.

Figure 7:
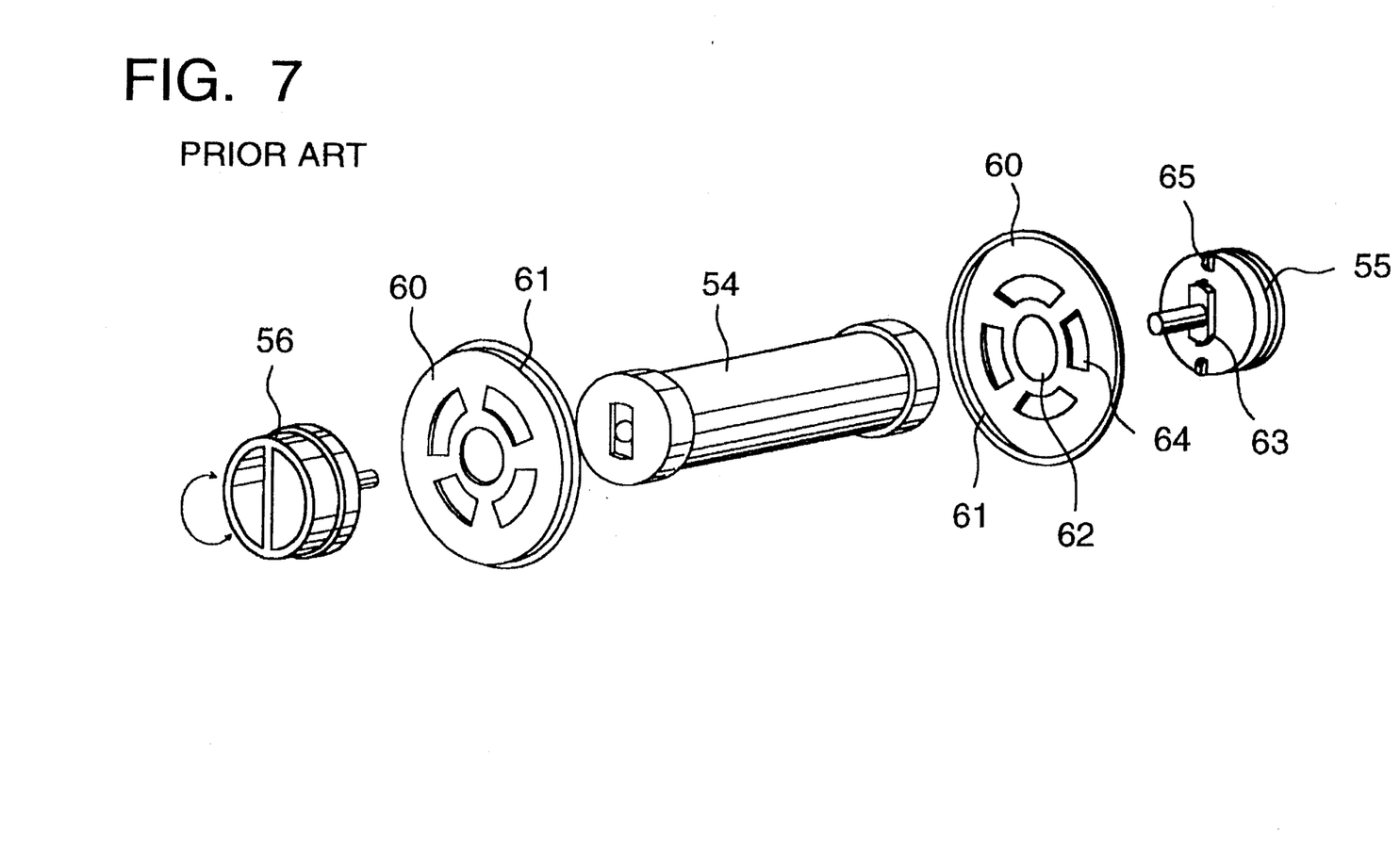
FIG. 7 is an exploded perspective view around a spool shaft of the cartridge.

That is, as shown in the prior art of FIG. 7, flexible flanges 60 made of synthetic resin are prepared on both end portions of the spool shaft 54 in the manner that the flanges are sandwiched in between hubs 55 and 56. Both end portions of the film 53 wound around the spool shaft 54 are pressed by rising portions 61 of the flanges 60 in order to prevent the film 53 from loosening and spreading like a spring. When the film 53 is not loosened as described above, the leading edge of the film 53 can be thrust out of the cartridge main body 50 according to the rotation of the spool shaft 54 by operating hubs 55 and 56.

A vacuum forming manufacturing method of the flange is disclosed in Japanese Patent Publication Open to Public Inspection No. 251,841/1992.

As a synthetic resin forming method, the following methods are enumerated: vacuum forming and thermal press-forming in which a resin sheet is used as material; injection molding in which resin pellets are used as material. It is widely known that these methods can be equally and effectively used in industry.

However, as a result of investigations by the inventors, the following disadvantages could be found in the flanges manufactured by the method disclosed in Japanese Patent Publication Open to Public Inspection No. 251841/1992: torque values when the film is pulled out of or wound into the cartridges fluctuated widely; and the photographic performance of the unexposed film was severely influenced by undetermined causes. Further, when a film in which a magnetic recording layer was provided as disclosed in U.S. Pat. No. 4,864,332 and U.S. Pat. No. 4,965,627 was used for a cartridge with flanges manufactured by the foregoing Japanese Patent Publication Open to Public Inspection No. 251841/1992, defects caused by unknown causes were found.

In view of the foregoing, the object of the present invention is to provide a manufacturing method for flanges in which: the quality is uniform; the performance of a film accommodated in the cartridge is not deteriorated; the productivity of cartridges is excellent; and the manufacturing cost is low.

SUMMARY OF THE INVENTION

A method of manufacturing flanges for use in a film cartridge to accomplish the aforesaid object of the present invention is applied for manufacturing flanges made of resin, into which a spool shaft of the film cartridge is inserted and which is used for preventing the film from loosening, wherein the flanges are manufactured by means of injection molding in a metallic mold in which a gate is vertically formed in a rising portion continuously provided in the periphery of the flat portion of the flanges.

DETAILED DESCRIPTION OF THE INVENTION

Next, referring to the attached drawings, a method according to the present invention will be described in more detail as follows.

Figure 1:
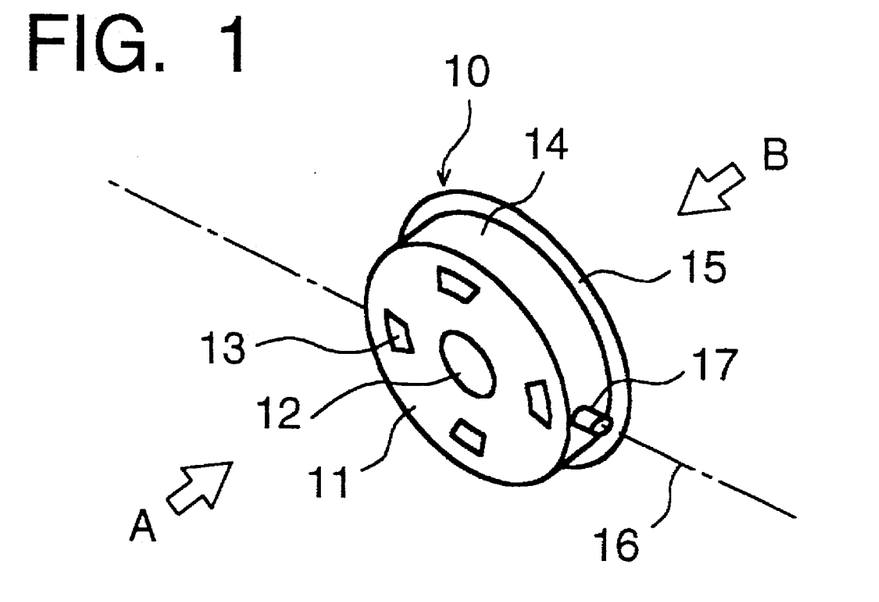
FIG. 1 is a perspective view of a flange.

FIG. 1 shows a flange 10 which is manufactured according to the present invention. In this flange 10, a central opening 12 into which a spool shaft of a cartridge, which is not shown in the drawings, is inserted, and openings 13 to control the direction of rotation are provided in a flat portion 11. Further, the flange 10 has rising portion 14 (having an annular shape) to regulate rewinding of a film inside the cartridge, and a collar 15 for reinforcement of the rising portion is provided on an end portion of the rising portion 14.

In FIG. 1, an injection molding parting line is shown by a one-dotted chain line 16. A gate residual portion 17 is shown on the rising portion 14 on the parting line 16.

When the flange 10 having a shape shown in FIG. 1 is formed by an injection molding method, in the case where the flange is formed by a metallic mold composed of a male mold and a female mold which are respectively closed, the following gate positions are listed. That is, the following gate positions are considered to be appropriate: a flat portion 11, an end or a flat portion of a collar portion 15 as a direct gate in which an end portion of the spool is directly connected with a molded product and a runner is not necessary; inside a central opening 12 as a disc gate; and a circumferential portion of the flat portion 11 or the collar portion 15 as a circular gate. However, in the case where these gates are provided on the flat or collar portion, the following problems may be encountered when the residual gate portion exists at these gate portions: the residual gate portion comes into contact with other members; or the film is damaged. Accordingly, an operation, by which the residual gate portion is completely removed, is necessary as an after-process after flange molding. In the case of the disc gate, the residual gate portion by which the film is damaged is made on the disc gate position. When the residual gate portion results from fluctuations of molding conditions, the film-shaped residual gate portion exists inside the central opening. When the flange is mounted on the spool shaft, sometimes the spool shaft can not be inserted into the flange, or because clearance between the flange and the hub becomes small due to the residual gate portion, the flange is rotated with the spool shaft, and the flange is rotated in both directions. Accordingly, sometimes jamming occurs when the film is wound.

Figure 2:
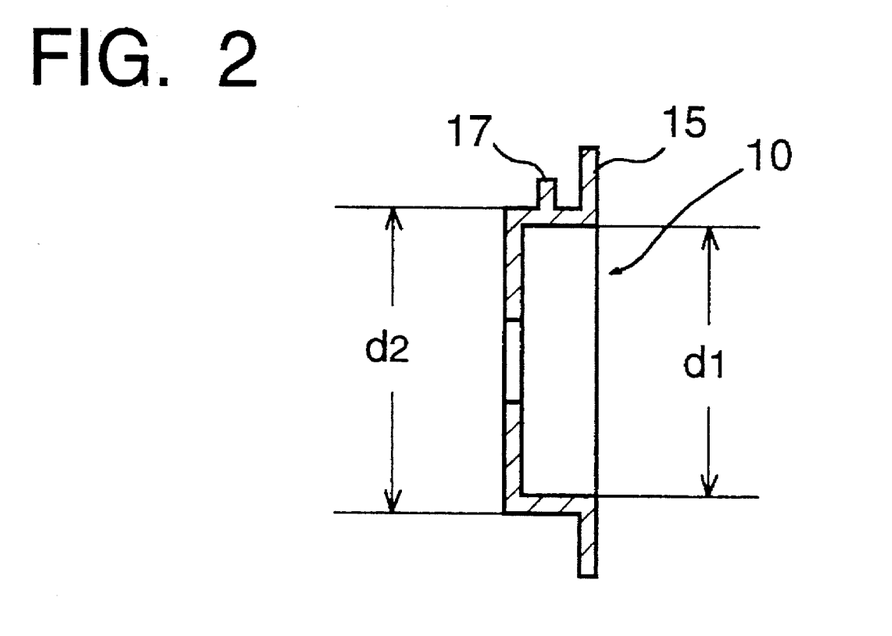
FIG. 2 is a sectional view of the flange.

In contrast to the foregoing, even when the gate remains as a residual portion 17 in the case where the gate position is set on the rising portion 14 of the flange 10, if the height of the residual portion 17 of the gate is lower than that of the collar portion 15 as shown in FIG. 2, the residual portion does not come into contact with other members. Accordingly, it is not necessary that the after-process, such as a removal by cutting, is carried out.

The width of the collar portion 15 provided on the end of the rising portion 14 of the flange 10 is 0.2 mm to 1.0 mm, and more preferably 0.2 mm to 0.5 mm, considering the film pressing strength of the rising portion, easy injection of resin, and easy production of the metallic mold.

Plastic resin material, such as polypropylene, polyethylene, polystyrene, ABS, and ionomer, is used for molding material. However, considering flexibility of the flange, polyethylene, polypropylene, or ionomer resin is preferable.

Further, when the position of the gate is determined as shown in FIG. 1 and FIG. 2, injection molding can be performed, in which a large number of flanges can be molded, and which will be described later.

Figure 3:
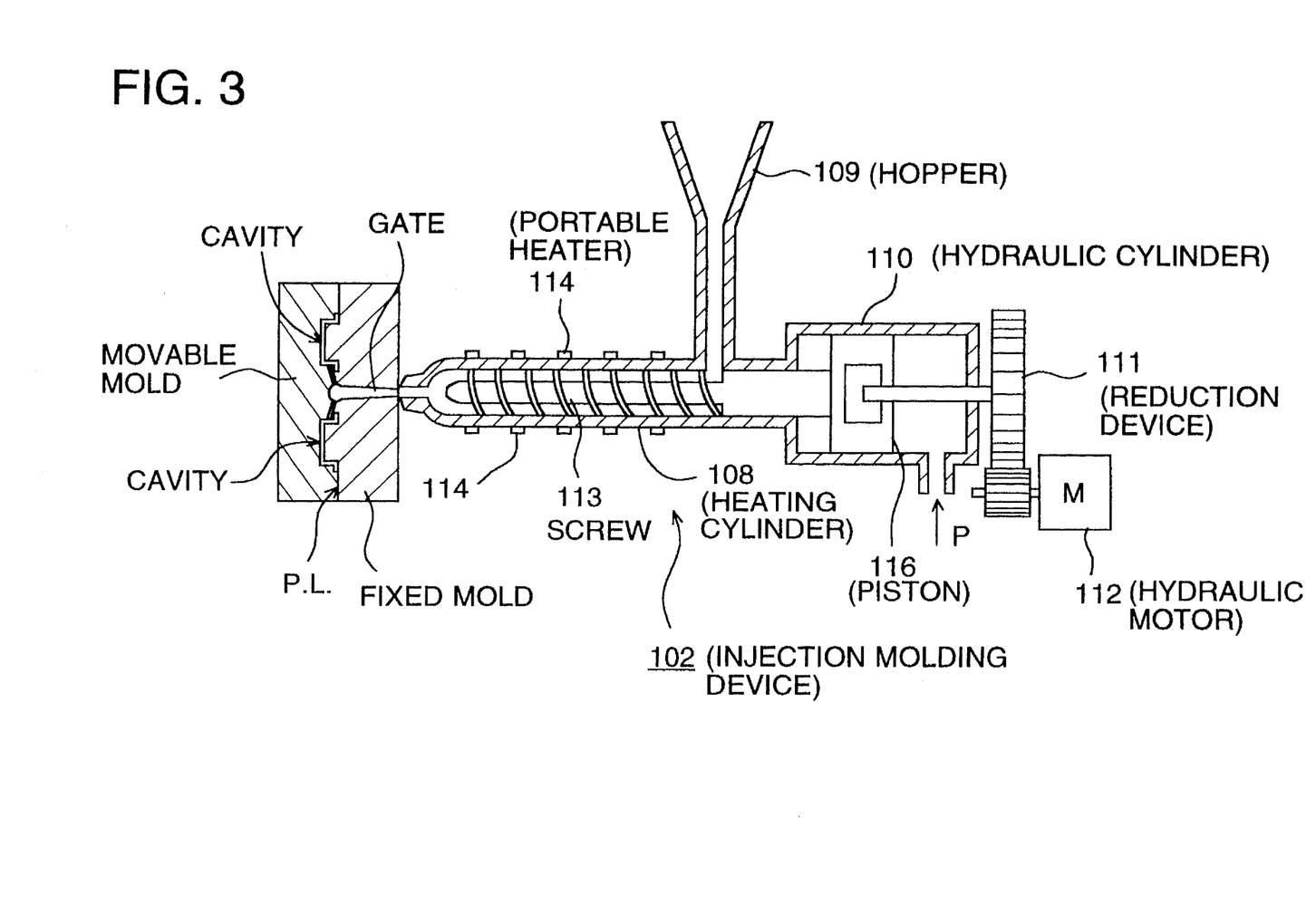
FIG. 3 is a sectional view showing a model of a metallic mold of injection molding.

An injection molding apparatus and a metallic mold are shown in FIG. 3. The apparatus comprises a flange molding metallic mold portion and an injection molding portion. The flange molding metallic mold portion comprises a fixed metallic mold and a movable metallic mold, and a molding space (a cavity), in which the flange is molded, is formed in a mating face between these molds as shown in FIG. 1 and FIG. 2. A gate through which molten resin is injected communicates with the molding space (cavity), and the molten resin supplied from the outside of the metallic mold is injected through the gate. Although only two molding spaces (cavities) are shown in FIG. 3 for convenience, normally, a larger number of spaces are formed in the molding space, and the resin is injected into these spaces at the same time.

The foregoing injection molding apparatus 102 shown in FIG. 3 is a so-called screw type comprising: a heating cylinder 108 by which molding material is heated and kept molten; a portable heater 114 provided around the heating cylinder 108; a screw 113 by which molten resin is kneaded and injected into the metallic mold; a hydraulic cylinder 110 having a piston 116 by which the injection force is given to the screw 113; a hydraulic motor 112 by which the rotational force is given to the screw 113 through a reduction device 11; and a hopper 109 from which molding material is supplied to the heating cylinder 108. Accordingly, the amount of the resin to be injected is determined by the stroke of the piston 16.

Figure 4:
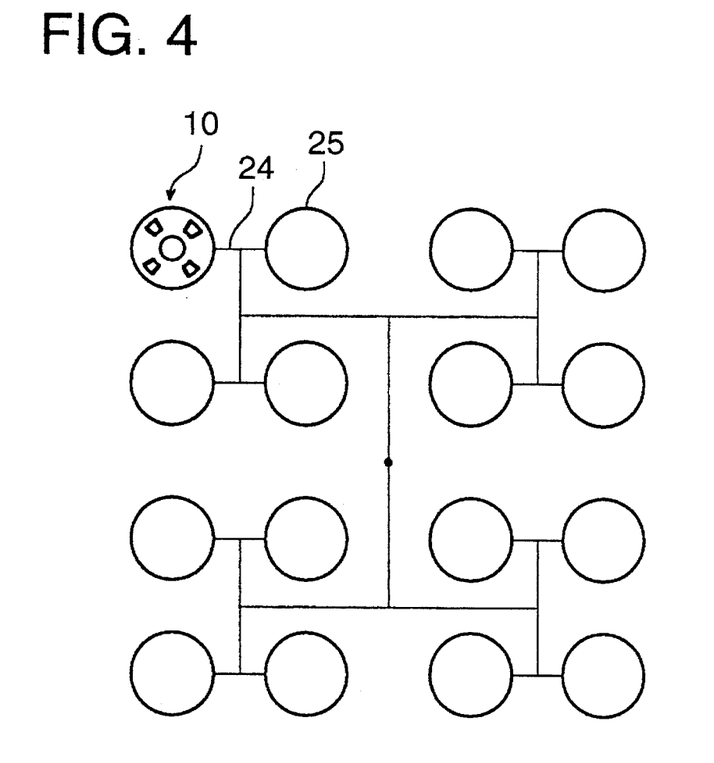
FIG. 4 is a perspective view showing the condition of molding.

As an example of a case in which a large number of flanges are produced, positions of cavities and runners in the case of 16 flanges are shown in FIG. 4.

When a large number of flanges are produced, the distances of the runners from a sprue to the cavities are equal so that cavities are concurrently filled by resin materials. As a sectional shape of the runner, a circular shape in which the fluid resistance of the resin material is small is mostly preferred, however, a semi-circular or trapezoidal shape may also be used.

Figure 5:
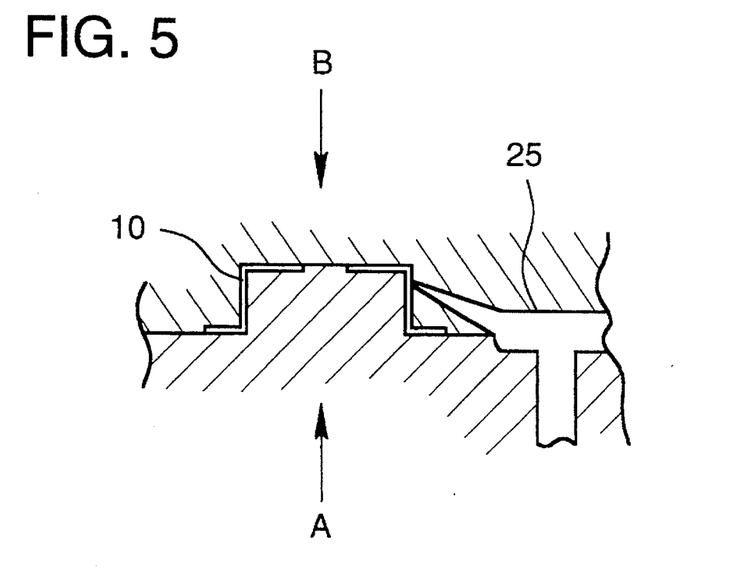
FIG. 5 is a sectional view showing a model of another embodiment of the metallic mold used in the injection molding.

FIG. 5 is a view showing a model of a metallic mold of the other embodiment according to the present invention, in which injection molding by two metallic molds of the fixed mold A and movable mold B is performed, and a submarine gate is used as a gate 25. The submarine gate has an advantage in which it can be used in the two-plate type structure. The submarine gate has the structure in which a cone-shaped hole provided at an inclination of about 45° in a mold plate of the fixed or movable metallic mold side is communicated to the side surface of the cavity.

The submarine gate can be used also in the molding method shown in FIGS. 2 and 3.

EXAMPLE

A plurality of polyethylene resin flanges were respectively produced by the method according to the present invention and the method disclosed in Japanese Patent Publication Open to Public Inspection No. 251841/1992 (vacuum forming) so that an inner diameter $d_1$ of a film accommodation side and an outer diameter $d_2$ in one method are equal to those of the other method, and the thickness $(d_2-d_1)/2$ of the rising portion 14 is 0.3 mm in both methods. The flanges were assembled onto the cartridges, and evaluated by the method which will be described later. The results are shown in FIG. 8.

Figure 9:
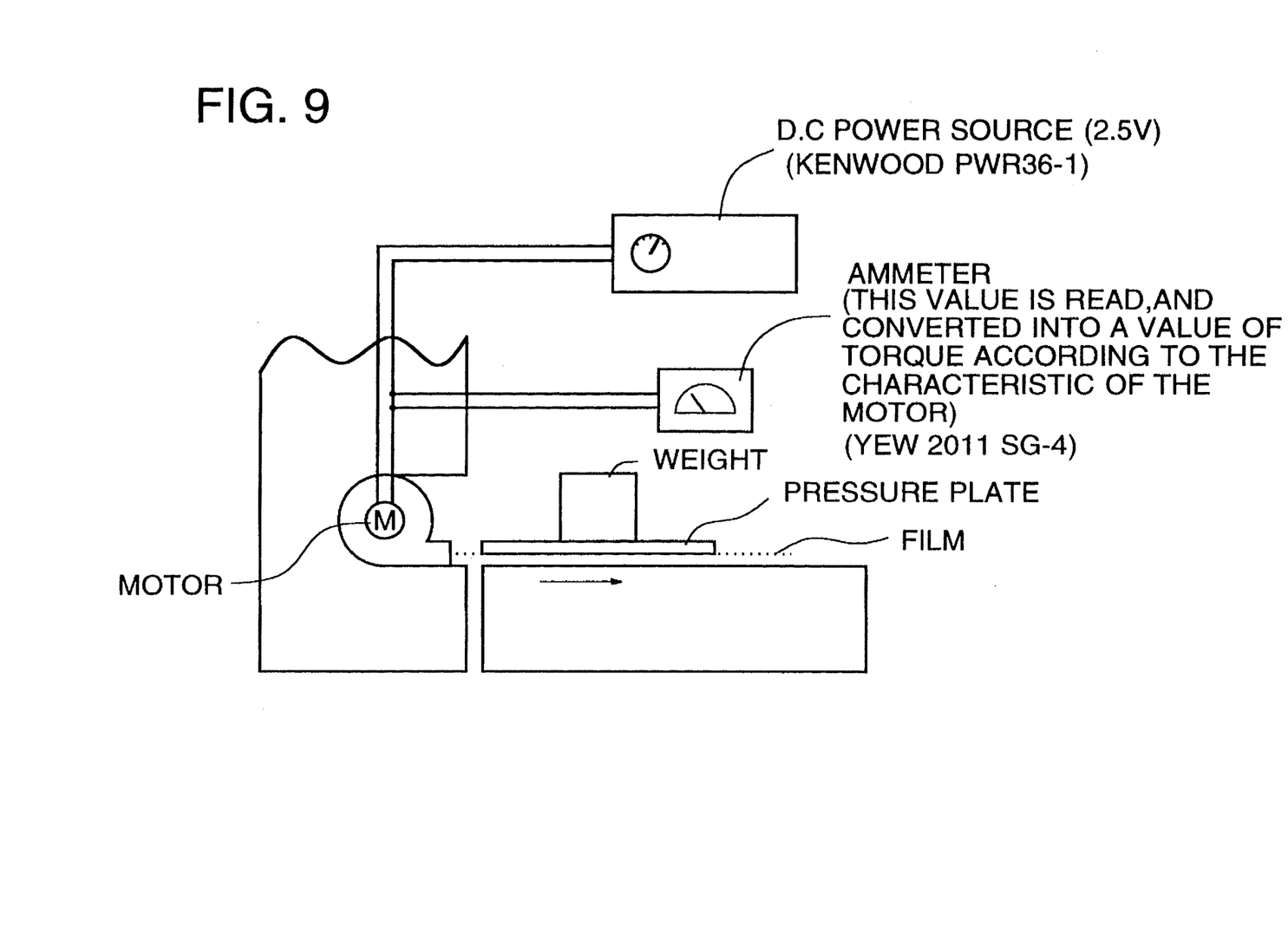
FIG. 9 is a testing device for measuring the values of FIG. 8.

A film with a magnetic layer was accommodated in the cartridge, and a film feeding test was conducted in an evaluation apparatus shown in FIG. 9 when mechanical resistance in a camera was changed by a weight provided on an acrylic plate, in the case where an operating temperature of the camera is low (−20° C.) and high (60° C.). The film can be fed when a feeding torque, to which the mechanical resistance is added, is larger than the feeding torque in the camera. A camera used for a film with a magnetic layer is provided with a magnetic head for recording and reproducing, and other mechanical resistance is added to the film in addition to the mechanical resistance of a pressure plate section necessary for securing the film flatness of an exposing film as in conventional cameras. Accordingly, it is necessary that the film is wound around the winding spool against this mechanical resistance without being bent.

Figure 8:
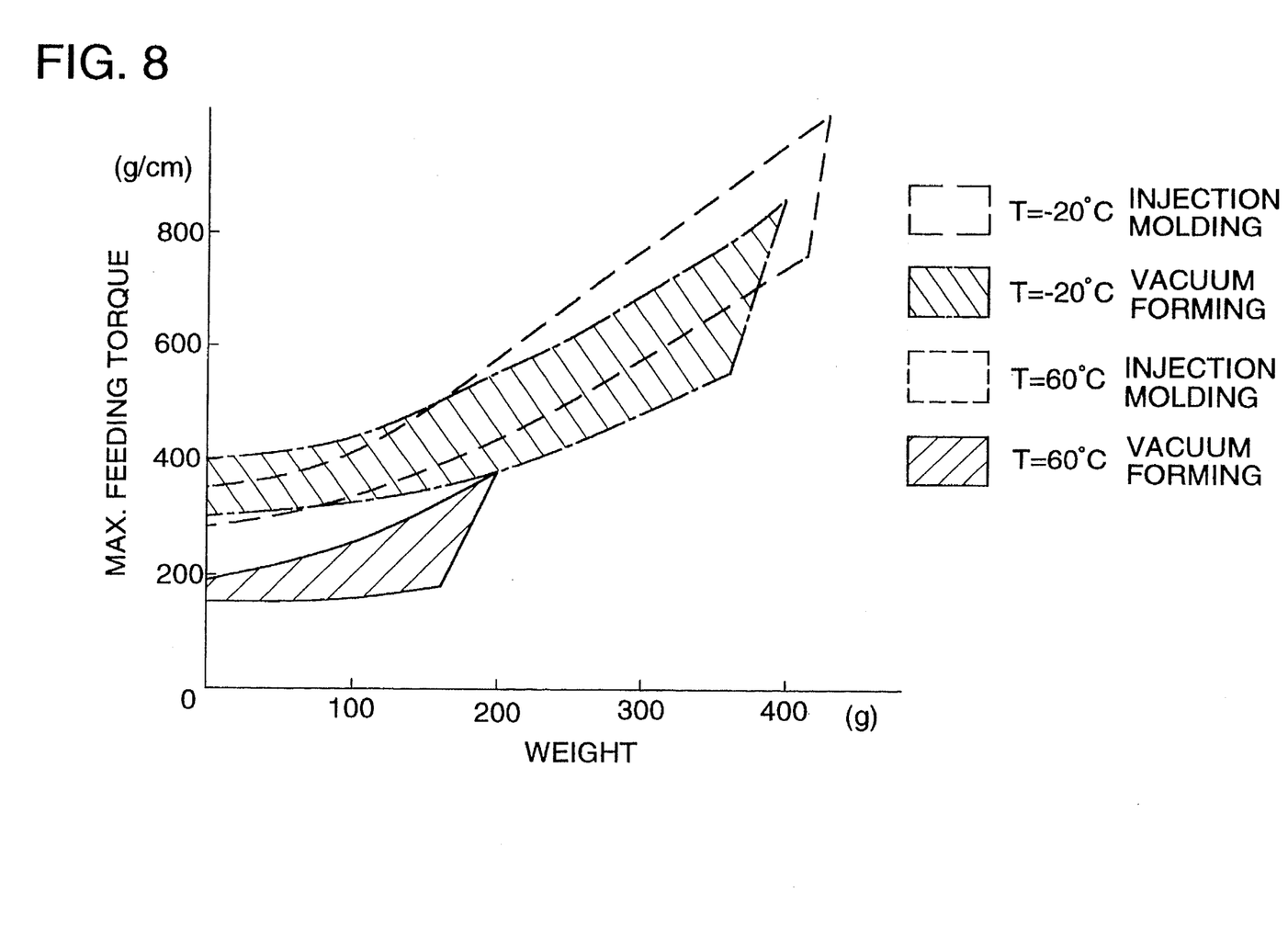
FIG. 8 is a chart showing Max Feeding Torque against weight.

In FIG. 8, a weight load is shown by the horizontal axis and a feeding torque is shown by the vertical axis.

As a result of this evaluation, the following advantages have been found as compared to the cartridge using the flange produced by the method disclosed in in Japanese Patent Publication Open to Public Inspection No. 251841/1992, even under the low and high temperature conditions: the cartridge produced by the method according to the present invention can feed the film even under the conditions of a high load in the camera; even when the resistance with the same value as the foregoing load exists in the camera, the film feeding torque is higher in the case where the flanges according to the present invention are used for the cartridge; and the fluctuations of the torque are smaller between the products. Accordingly, even when the resistance applied to the film differs depending on the cameras, in the case where the flanges produced by the method according to the present invention are used in the cartridge, the film can be easily fed, which is advantageous.

According to the methods of the present invention, because the quality is uniform and an after-process for cutting the gate residual portion 17 is not necessary after formation of the gate, the methods of the present invention is effective for decreasing the production cost and increasing the production efficiency. Further, the flange for the film cartridge in which there is no possibility that an emulsion surface or a magnetic recording layer in the film accommodated in the cartridge is damaged, and by which battery consumption in a camera is small, can be provided.

An object of the present invention is to provide a method for manufacturing flanges for use in a film cartridge, the method being characterized in that: a gate is provided at a position where flange performance is not affected; production efficiency is high so that production cost is low; there is no possibility of damages on an emulsion surface of the film; and an electric consumption of batteries provided in a camera is low.

A method for manufacturing flanges for use in a film cartridge of the present invention is applied for manufacturing flanges made of resin, into which a spool shaft of the film cartridge is inserted, and which are used for preventing the film from loosening, wherein the flanges are manufactured by the method of injection molding with a metallic mold in which a gate is vertically formed in a rising portion continuously provided in a periphery of a flat portion of the flange.

What is claimed is:

1. A method of manufacturing a rotatable molded flange, to be mounted on a spool shaft in film cartridges, by an injection molding process, comprising the steps of:

providing a mold, said mold including at least one cavity therein to form the rotatable molded flange, the rotatable molded flange comprising:
an annular portion having an outer circumferential surface,
a flat disk portion integral with one end of the annular portion, the flat disk portion having a central opening into which the spool shaft is inserted so that the flange is rotated together with the spool shaft around a rotation axis of the spool shaft, and
a collar ring portion integral with the other end of the annular portion, an outer diameter of the collar ring portion being larger than a diameter of a circumferential surface of the annular portion so that the collar ring portion extends in a radial direction away from an axis of the annular portion and projects beyond the circumferential surface of the annular portion;

forming a gate in the mold to provide a fluid communication to the at least one cavity;

injecting a resin into the at least one cavity in the mold through said gate, said at least one cavity corresponding in a shape thereof to both the rotatable molded flange and to the gate;

the gate being formed in the mold to be at a position opening to the outer circumferential surface of the annular portion so that the resin is injected into the at least one cavity through the gate;

removing the rotatable molded flange from the mold; and allowing a remaining molded gate portion of the rotatable molded flange to remain on the outer circumferential surface of the annular portion of the rotatable molded flange, wherein a height of the remaining molded gate portion does not extend above a top potion of the collar ring portion.

2. The method of claim 1, wherein the step of providing the mold comprises providing a plural cavity metallic mold and the at least one cavity comprises a plurality of cavities, each of said plurality of cavities having the gate and a runner connected to supply a resin to each cavity of the plurality of cavities so that a plurality of rotatable molded flanges are molded with the plural cavity metallic mold.

3. The method of claim 2, wherein the resin is selected from the group consisting of a polyethylene, polypropylene and an ionomer resin.

4. The method of claim 2, wherein:

the mold includes an upper mold portion, a lower mold portion and a plurality of side mold portions; and the method further comprises:
defining a plurality of injection cavities between the upper mold portion, the lower mold portion and the plurality of side mold portions to provide a plurality of pairs of flanges, each pair of flanges being positioned to be perpendicularly in tandem relative to each other, one flange of a pair of flanges having a shape which correspond to a shape of the other one of said pair of flanges when the one flange is mirror inverted so that the circumferential surface is on an outside portion of the one flange.

5. The method of claim 1, wherein:

the mold includes an upper mold portion, a lower mold portion and a plurality of side mold portions; and the method further comprises:
defining a plurality of injection cavities between the upper mold portion, the lower mold portion and the plurality of side mold portions to provide a plurality of pairs of flanges, each pair of flanges being positioned to be perpendicularly in tandem relative to each other, one flange of a pair of flanges having a shape which correspond to a shape of the other one of said pair of flanges when the one flange is mirror inverted so that the circumferential surface is on an outside portion of the one flange.

6. The method of claim 1, wherein:

the mold includes an upper mold and a lower mold; and the method includes the additional steps of:

forming the mold to have a plurality of injection cavities therein; and positioning the plurality of injection cavities in the mold so that each flange has the flat disk portion thereof formed in a horizontal plane that is between the upper and lower molds; and wherein the gate for injecting the resin into the mold is inclined at an angle of about 45° relative to one of said upper mold and said lower mold, said gate being in fluid communication with the plurality of injection cavities.

7. The method of claim 1, wherein the step of providing the mold comprises providing a plural part mold.

8. The method of claim 1, wherein the step of providing the mold includes a step of forming the at least one cavity such that a width of the collar ring portion is 0.2 mm to 1 mm.

9. The method of claim 8, wherein the at least one cavity is formed such that the width of the collar ring portion is 0.2 mm to 0.5 mm.

* * * * *